May 22, 1951 F. J. NAGEL 2,554,262
LAMINATED METAL
Filed March 15, 1945
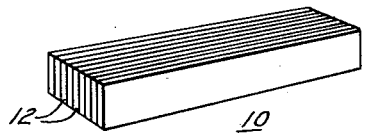
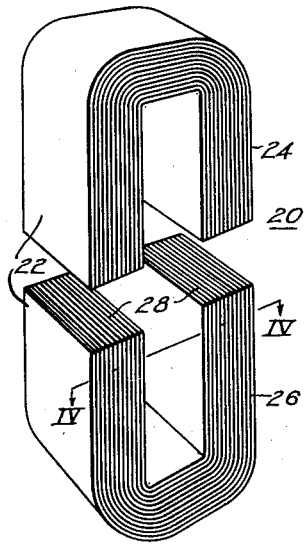
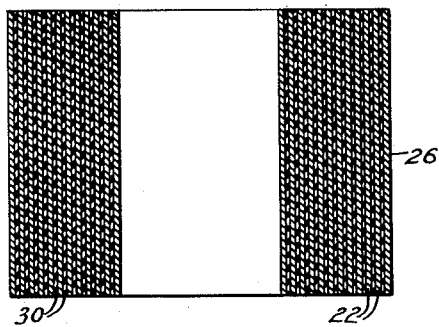
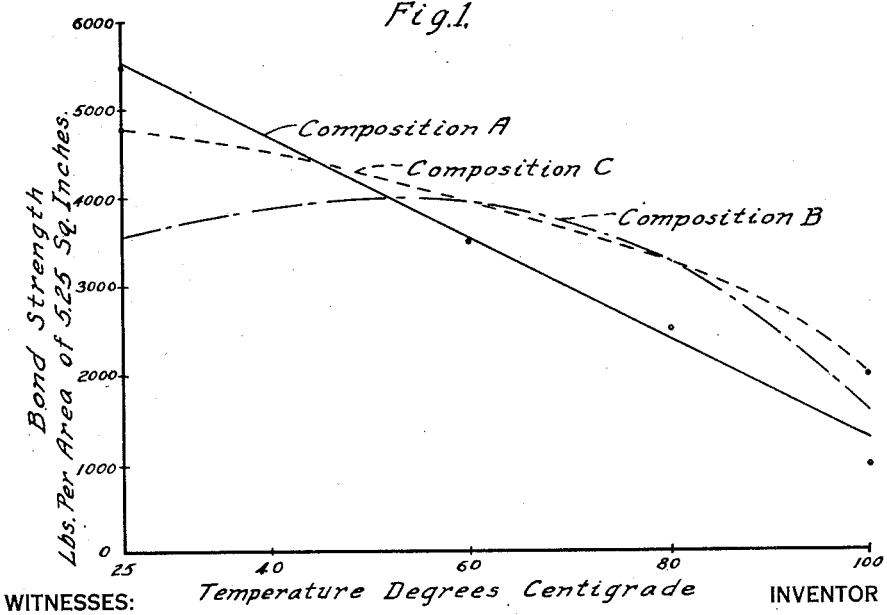
WITNESSES: INVENTOR
Fritz J. Nagel.
BY
ATTORNEY Patented May 22, 1951

2,554,262

UNITED STATES PATENT OFFICE 2,554,262

LAMINATED METAL

Fritz J. Nagel, Pittsburgh, Pa., assignor to Westinghouse Electric Corporation, East Pittsburgh, Pa., a corporation of Pennsylvania Application March 15, 1945, Serial No. 582,981

6 Claims. (Cl. 154—43)

This invention relates to resinous bonding compositions and, in particular, to resinous bonding compositions capable of bonding metal laminations to one another, to provide for building members that can be machined.

It has been proposed heretofore to apply thermoplastic resins as bonding agents for preparing consolidated members from laminations of metal. However, such thermoplastic resins are not effective binders at moderate elevated temperatures. In fact, at 80° C., most thermoplastic resins generally have no significant bond strength. Members composed of laminations bonded with resinous compositions often may be subjected to temperatures as high as 100° C., and therefore the prior art thermoplastic bonding agents are unsuitable for use at elevated temperatures.

A critical requirement for a good bonding composition, particularly for bonding metals, is that the hardened or set bonding composition be flexible and resilient in order to withstand thermal expansion, to absorb shocks and to hold the bonded members together under conditions of use. Thermosetting resins, such as phenol-formaldehydes, while capable of withstanding elevated temperatures, are brittle, lacking good flexibility and, therefore, fail under many conditions incident to normal use.

An object of this invention is to provide a flexible bonding composition or adhesive suitable for bonding metals and other materials, the adhesive being characterized by a high strength at elevated temperatures.

A further object of the invention is to provide a flexible adhesive capable of a high bond strength, by combining a thermoplastic vinyl derivative with an arylamine-phenol-formaldehyde resin.

Another object of the invention is to provide a magnetic core composed of laminations of a magnetic metal bonded with a resinous bonding composition capable of maintaining a good bond sufficient to permit machining of the core, the bond being excellent at elevated temperatures without impairing the magnetic properties of the metal.

A still further object of the invention is to provide for building cores of metal sheets by applying thereto a resin composed of an aniline-phenol-formaldehyde reaction product and a thermoplastic vinyl resin.

Other objects of the invention will, in part, be obvious and will, in part, appear hereinafter. For a fuller understanding of the nature and objects of the invention, reference should be had to the drawing, in which:

Figure 1 is a graph plotting bond strength against temperature;

Fig. 2 is a perspective view of a bonded bar core;

Fig. 3 is an exploded perspective view of a bonded core comprising two U-shaped core segments; and Fig. 4 is an enlarged cross-sectional view taken along line IV—IV of Fig. 3.

It has been discovered that an adhesive or bonding composition prepared by combining an arylamine-phenol-formaldehyde resin in the partially reacted, solvent soluble stage with a thermoplastic resinous polymer of a vinyl compound in a specific range of proportions will produce unusually good bonds, meeting all expected requirements, when applied to metals and other materials. The bonding composition is particularly useful since it possesses a high bond strength even at temperatures of the order of 100° C. The bonding composition is extremely flexible after having been applied to members and set to a hardened condition. When applied to strain-sensitive materials, such as magnetic sheets, the bonding composition gives high-strength bonds, but is so flexible that significant strains are not induced therein, whereby the alternating-current magnetic losses are not appreciably increased.

The arylamine-phenol-formaldehyde resin is prepared from a phenol, such, for example, as phenol (hydroxy benzene), cresol, cresylic acid, or other monohydroxy benzene homologues capable of reacting with formaldehyde to produce resins. The proportions of arylamine, such as aniline, to prepare the resin may range from 10% to 110% of the weight of the phenol. Excellent results have been obtained where the arylamine varies from 30% to 50% of the weight of the phenol. The formaldehyde may be supplied as the commercial aqueous solution containing from about 37% to 40% formaldehyde, or para-formaldehyde, trioxymethylene, or other formaldehyde polymer or other formaldehyde yielding substance. Mixtures of aqueous formaldehyde solutions and paraformaldehyde, hexamethylene tetramine or the like, have been employed with success. The term "formaldehyde" as used herein is intended to include such polymers and mixtures. The proportions of the formaldehyde found satisfactory for this invention are from 1 to 1.2 mols of the formaldehyde per mol of phenol and aniline combined. A basic catalyst, for example, lime, ammonia, ethylene diamine and ethanolamine, in the proportions of approximately 1/6% to 1/2% of the weight of the phenol and aniline, is employed in carrying out the reaction.

Suitable arylamines for use in preparing the partial reaction product are aniline, diphenylamine, ortho, meta and para toluidines, metaphenylenediamine, naphthylamine and mixtures thereof. In particular, the simple substituted phenyl or naphthyl, primary or secondary, mono- and diamines may be reacted with a phenol and formaldehyde.

The reaction of the aniline, phenol and formaldehyde to form a partially reacted resin is preferably carried out at low temperatures in a closed reaction vessel. Good results have been obtained by refluxing for periods of the order of one hour at approximately 100° C. and thereafter applying a vacuum to the reaction vessel to remove water. A maximum dehydration temperature of about 110° C. to 120° C. will result in a product having characteristics most suitable for the practice of the invention. It will be apparent that the reaction conditions may be varied from these values, in order to produce a predetermined type of reaction product to suit the requirements of the adhesive application. It is desirable that the reaction produce a partially reacted aniline-phenol-formaldehyde resin in the A-stage which is soluble in conventional hydrocarbon solvents. Such solutions of the resin should have a low viscosity for ease in application of the bonding composition or adhesive produced therefrom.

A typical aniline-phenol-formaldehyde resin was prepared according to the following example:

Example I

| | Pounds |
|---|---|
| Aniline | 160 |
| Phenol | 533 |
| Paraformaldehyde | 200 |
| Formaldehyde, 40% | 110 |
| Ethylene-diamine, 70% | 3 |

The above ingredients were reacted by refluxing in a closed reaction vessel provided with a condensing column, for fifty minutes at a temperature of about 99° C. Thereafter, vacuum was applied to the reaction vessel and the temperature during dehydration rose from 58° C. to 110° C. After forty minutes, the dehydration was substantially complete. Thereafter, approximately 520 pounds of a solvent, such as benzol, or a 50-50 mixture by weight of benzol and 95% ethanol, was introduced to dissolve the partial reaction product, to produce a resin solution. The solution had a viscosity of less than 100 centipoises at 25° C.

Example II

The following ingredients were introduced into a closed reaction vessel:

| | Parts |
|---|---|
| Cresylic acid | 330 |
| Aniline | 83 |
| Diphenylamine | 20 |
| Paraformaldehyde | 90 |
| Formaldehyde (40% aqueous solution) | 150 |
| Ethylene diamine | 1 |

The mixture was refluxed for one and one-half hours, then vacuum was applied to remove the water. The temperature rose to 110° C. when the vacuum was broken and 400 parts of benzene was added to produce a resin solution.

Example III

Into a closed reaction vessel, the following were introduced:

| | Parts |
|---|---|
| Diphenylamine | 254 |
| Phenol | 564 |
| Paraformaldehyde | 150 |
| Formaldehyde (40% aqueous solution) | 335 |
| Ethylene diamine | 1 |

After refluxing for 40 minutes, the partial reaction product was dehydrated by applying a vacuum to the vessel. During dehydration, the temperature increased from 58° C. to 100° C. Upon adding 600 parts of benzene a low viscosity resin solution was produced.

For producing the bonding compositions, the other component is the thermoplastic resinous polymer of a vinyl or vinyl derivative compound, which is preferably a compound having a unit formula

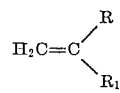

where R represents hydrogen, or an alkyl group, and R₁ represents an alkyl, acyloxy or aryl group. Examples of the polymers of such compounds are the polymers of vinyl acetate, styrene, vinyl acetate-vinyl chloride copolymer forming mixtures, methyl acrylate, methyl methacrylate, propyl methacrylate, vinyl acetal, vinyl formal, polyvinyl alcohol and the like. The thermoplastic polymer may be of low, medium or high molecular weight, depending upon the requirements of the application to which the bonding material is to be applied. For bonding non-porous materials, a medium molecular weight polymer will be usually preferred, since the viscosity of the resin solution is low thus facilitating application, while the bonding strength is high. For treating porous materials, such as paper or wood, a higher molecular weight vinyl type polymer would be preferred, since this inhibits excessive penetration of the bonding composition into the porous material.

In preparing the adhesive bonding composition, the thermoplastic resinous vinyl type polymer, dissolved in a suitable solvent, is combined with the aniline-phenol-formaldehyde resin solution in the proportions of one part of aniline-phenol-formaldehyde to from 0.3 to 10 parts of the thermoplastic polymer, both based on the weight of resin solids. The highest bond strength in the range of temperatures from 25° C. to 100° C. have been obtained when the proportions of the thermoplastic polymer varied from 50% to 150% of the weight of the aniline-phenol-formaldehyde resin. The composition may be applied by dipping, brushing, spraying, flowing or the like. In some cases individual sheets can be given a coating, the coating dried to remove the solvent and the sheets superimposed and consolidated under heat and pressure.

The following are examples of the bonding compositions of this invention, their uses and properties:

Example IV 70 parts by weight of the partial reaction product of aniline-phenol-formaldehyde containing 30% aniline based on the phenol content thereof was admixed with 100 parts by weight of polyvinyl acetate of medium molecular weight. The solvent was a mixture of benzol, acetone, and ethyl acetate. When applied to metal laminations and baked for four hours at 200° C., the bond strength of the composition for an area of 5.25 square inches was that shown in Fig. 1 of the drawing as composition A. The bonding strength was determined by a direct tensile test of the bonded laminations.

Example V 100 parts of medium molecular weight polyvinyl acetate was combined with 100 parts of aniline - phenol - formaldehyde containing 30% aniline based upon the phenol content. After applying to laminations of iron and baking for four hours at 225° C., the bond strength was determined at various temperatures. The bond strength is shown in Fig. 1 of the drawing as the curve labeled composition B.

Example VI 100 parts by weight of the aniline-phenol-formaldehyde resin of Example I was combined with 125 parts by weight of medium molecular weight polyvinyl acetate. When applied to laminations and baked at 225° C. for four hours, the bond strength is that shown by the curve labeled composition C in Fig. 1. It will be noted that the bond strength at 100° C. is over 2000 pounds for an area of 5.25 square inches. It is believed that bond strengths of this order for this temperature are unusual. They indicate that the bonding material would be highly desirable for uses where high temperatures of this order are involved.

Example VII

One part by weight of an aniline-phenol-formaldehyde resin containing 42% aniline based on the weight of phenol was mixed with three parts of polypropyl methacrylate dissolved in a solvent composed of methyl ethyl ketone and ethyl acetate. The bonding composition was ready to use upon mixing and gave good results when applied as a binder to various materials.

Example VIII 85 parts by weight of the resin solution of Example I was admixed with a 28% polyvinyl acetate solution in various proportions ranging from 50 to 150 parts by weight of the polyvinyl acetate solution.

The adhesive bonding compositions of this invention may be employed for uniting articles of any desired shape or form, such as sheets, plates, blocks, rods, or the like. The articles to be joined may be of wood, metal, ceramic, natural and synthetic resins with and without various fillers, paper, cardboard, and various fabrics, such as cotton, asbestos, glass fiber cloth, and the like. The same or dissimilar materials may be united. For example, sheets of phenol-formaldehyde laminate may be bonded by the bonding composition to one another or to metal plate to provide for a predetermined body. Strains due to the differences in thermal expansion of dissimilar materials are readily accommodated due to the excellent resiliency and flexibility of the compositions. Cotton and asbestos or glass tape may be adherently bonded to copper wire in preparing electrical insulation. Pressboard spacers may be prepared by bonding a plurality of sheets of pressboard until a predetermined thickness of the spacer is produced.

The bonding composition of this invention is heat-treated after having been applied to members in order to remove the solvent and to complete the curing of the partially reacted aniline-phenol-formaldehyde as well as to interact it with the thermoplastic polymer. Temperatures of from 140° C. and higher are suitable for the curing. Heat may be applied by placing the members in an oven, with or without pressure thereon during the curing. For heat treating the members, high-frequency electrical currents may be employed as the heat source. Other expedients for applying heat to members, in order to expedite curing and hardening of adhesives, are well known and need not be detailed herein.

The bonding compositions of this invention are exceptionally useful for bonding metals since, by applying and curing the adhesive, composite metal members may be durably yet flexibly united. Magnetic cores, coils, and numerous other members employed in the electrical industry may be produced by means of the adhesive composition herein described.

An outstanding advantage of the bonding compositions of this invention, when applied to metal laminations, is that the bonded laminations may be readily machined by cutting, sawing, milling, drilling, grinding, and the like, without the delamination, as if the member were a solid body of metal.

The adhesive composition is resistant to acids and alkalies, whereby the bonded members may be etched in acids and treated with cleaning solutions without any damage.

As an example of the advantageous use of the bonding compositions of this invention in building of a magnetic core, reference should be had to Fig. 2 of the drawing, showing the bonded bar core 10, composed of a plurality of laminations 12 of magnetic material bonded into a unitary bar by the adhesive composition. The laminations are coated individually with the composition, dried to remove the solvent, stocked and consolidated under heat and pressure. The body 10, after bonding, may be machined to shape by milling, sawing and grinding. Thereafter, the burrs and slivers may be removed by etching in any suitable acid. The member 10 will be found to have both excellent physical and magnetic characteristics.

Within recent years, there has been made available to the electrical industry, silicon-iron magnetic sheet material in which the crystals are so oriented that substantially all the crystals in the sheet having a preferred direction of magnetization. This orientation renders the magnetic sheet exceptionally efficient magnetically in one direction. However, one of the properties of such preferentially oriented magnetic sheet material is its high sensitivity to strains whereby the alternating-current losses increase unduly even for what would ordinarily be considered minor strains. In order to employ this magnetic material successfully, it is necessary to embody it in electrical apparatus without inducing undesirable strains therein.

It has been found that preferentially oriented magnetic material may be employed to best advantage when wound into a continuous core, such as shown in Fig. 3 of the drawing. The core 20 consists of a plurality of laminations 22 wound from one continuous strip. In order to facilitate the embodiment of the core 20 into electrical apparatus, it is necessary to cut the core into two parts, 24 and 26, with substantially plane faces 28, whereby, when the core halves are reassembled, there is no appreciable air-gap loss between the faces. Cores similar to core 20 shown in Fig. 3 have been prepared from preferentially oriented sheet magnetic material, ranging from thicknesses of over 13 mils down to 2 mils and less. Sheets of this thickness are quite flexible, especially in the thinner gages, and it is necessary in producing satisfactory cores that the wound laminations be united with a high bond strength binder of unusual flexibility so that it does not introduce appreciable strains. Two-mil thick magnetic sheet material, in particular, is readily deformed and is highly sensitive to bonding strains. A great number of resinous adhesive materials, available to the trade, have been tried as binders for the preferentially oriented material in the making of the type of core shown in Fig. 3. None has been found to be suitable. The bond strength has been inadequate in many cases. Every material tried has introduced excessive strains, resulting in high-electrical losses, whereby the efficiency of the cores is greatly impaired. The reduction in efficiency is more pronounced with the thinner magnetic sheet materials.

The bonding compositions of the present invention have been applied to all thicknesses of the preferentially oriented magnetic sheet material and cores produced therewith, with no significant strains induced in the magnetic material. The core members corresponding to 20 have been wound from a single strip of the magnetic sheet material 22 and immersed in the solution composed of aniline-phenol-formaldehyde and the thermoplastic polymer of a resinous compound having the unit formula

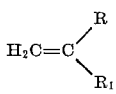

prepared as herein described. In spite of the fact that the space factor of the wound cores is high, often being 98%, and the interlaminar spaces are a fraction of a mil in thickness, good penetration and filling of the interlaminar spaces were attained. When the impregnated cores were heat-treated for several hours, at temperatures of the order of 200° C., the laminations were found to be firmly united with a highly flexible bond. As shown in Fig. 4, in a greatly enlarged cross-section, the binder compositon 30 of the invention was present between each of the laminations 22. The wound cores could now be cut readily with a milling cutter, saw, or thin grinding wheel. Negligible delamination occurred in practice. Even the two-mil thick magnetic material was so well bonded that the cutting could be readily accomplished. The burrs and slivers produced by the cutting operation were removed by grinding followed by acid etching. Excellent plane faces 28 were thus obtained. In use, the cores operate at temperatures 100° C. and higher, in many cases. The bonding materials of this invention maintained the integrity of the core without mechanical separation of the laminations at these high temperatures.

The resinous binder 30 between the laminations, after heat-treatment, is impervious to and insoluble in oil, water and many fluid dielectrics, even at temperatures of 100° C. Therefore, the composition is particularly suitable for use in making cores to be immersed in liquid dielectrics.

Since certain changes in carrying out the above invention may be made without departing from the scope of the disclosure, it is intended that all matter contained in the above description shall be interpreted as illustrative and not in a limiting sense.

I claim as my invention:

1. An adhesive comprising, in combination, the solvent soluble partial reaction product of 100 parts by weight of a phenol, 10 to 110 parts by weight of aniline and from 1 to 1.2 mols of formaldehyde per mol of phenol and aniline combined, and polyvinyl acetate in an amount of from 0.3 to 10 times the weight of the partial reaction product.

2. An adhesive comprising, in combination, the solvent soluble partial reaction product of 100 parts by weight of a phenol, 10 to 110 parts by weight of at least one arylamine selected from the group consisting of aniline, toluidine, phenylenediamine, and naphthylamine and from 1 to 1.2 mols of formaldehyde per mol of phenol and arylamine combined, and from 0.3 to 10 times the weight of the partial reaction product of a thermoplastic polymer selected from the group consisting of polyvinyl acetate, polystyrene, polyvinyl acetate-polyvinyl chloride copolymers, polymethyl methacrylate, polymethyl acrylate, polypropyl methacrylate, polyvinyl acetal, polyvinyl formal and polyvinyl alcohol, and a solvent to produce a solution of predetermined viscosity.

3. An adhesive comprising, in combination, the partial reaction product of about 160 parts by weight of aniline, 530 parts of phenol, 200 parts paraformaldehyde, and 110 parts of 40% formaldehyde, 520 parts by weight of solvent to produce a resin solution, combined with a solution of polyvinyl acetate having 28% solids, in the ratio of 85 parts by weight of the resin solution to from 50 to 150 parts by weight of the polyvinyl acetate solution.

4. A laminated metal member composed of a plurality of laminations and a binder applied between the laminations for bonding them into predetermined shape, the binder composed of the partial reaction product of 100 parts by weight of a phenol, 10 to 110 parts by weight of at least one arylamine selected from the group consisting of aniline, toluidine, phenylenediamine, and naphthylamine and from 1 to 1.2 mols of formaldehyde per mol of phenol and arylamine combined, and from 0.3 to 10 times the weight of the partial reaction product of a thermoplastic polymer selected from the group consisting of polyvinyl acetate, polystyrene, polyvinyl acetate-polyvinyl chloride copolymers, polymethyl methacrylate, polymethyl acrylate, polypropyl methacrylate, polyvinyl acetal, polyvinyl formal and polyvinyl alcohol.

5. A laminated metal member composed of a plurality of laminations and a binder applied between the laminations for bonding them into predetermined shape, the binder composed of the partial reaction product of 100 parts by weight of a phenol, 10 to 110 parts by weight of aniline and from 1 to 1.2 mols of formaldehyde per mol of phenol and aniline combined, and from 0.3 to 10 times the weight of the partial reaction product of polyvinyl acetate.

6. A machined member composed of a plurality of laminations of metal, a binder applied between the laminations for bonding them into the member, the bond composed of the partial reaction product of 100 parts by weight of a phenol, 10 to 110 parts by weight of aniline and from 1 to 1.2 mols of formaldehyde per mol of phenol and aniline combined, and from 0.3 to 10 times the weight of the partial reaction product of a thermoplastic polymer selected from the group consisting of polyvinyl acetate, polystyrene, polyvinyl acetate-polyvinyl chloride copolymers, polymethyl methacrylate, polymethyl acrylate, polypropyl methacrylate, polyvinyl acetal, polyvinyl formal and polyvinyl alcohol, the binder being of sufficient strength to permit the member to be machined to predetermined size and shape and the binder having good strength at temperatures of the order of 100° C.

FRITZ J. NAGEL.

REFERENCES CITED

The following references are of record in the file of this patent:

UNITED STATES PATENTS

| Number | Name | Date |
|---|---|---|
| 1,133,083 | Baekeland | Mar. 23, 1915 |
| 1,216,265 | Baekeland | Feb. 20, 1917 |
| 1,873,799 | Vacher | Aug. 23, 1932 |
| 1,955,731 | Bender | Apr. 24, 1934 |
| 1,994,753 | Cherry | Mar. 19, 1935 |
| 2,261,983 | Ford | Nov. 11, 1941 |
| 2,318,095 | Putman | May 4, 1943 |
| 2,372,074 | Ford | Mar. 20, 1945 |
| 2,374,078 | Coffman | Apr. 17, 1945 |

FOREIGN PATENTS

| Number | Country | Date |
|---|---|---|
| 120,874 | Austria | Jan. 26, 1931 |